United States Patent Office 3,560,435
Patented Feb. 2, 1971

3,560,435
METHOD OF POLYMERIZING ORGANOSILICON COMPOUNDS USING A NITRO CATALYST
Chi-Long Lee, Midland, Mich., assignor to Dow Corning Corporation, Midland, Mich.
No Drawing. Filed Oct. 24, 1968, Ser. No. 770,406
Int. Cl. C08f *11/04*
U.S. Cl. 260—46.5      17 Claims

ABSTRACT OF THE DISCLOSURE

A method for polymerizing organosilicon compounds is disclosed. Cyclic organosilicon compounds, such as $[(CH_3)_2SiO]_3$, and a catalyst which is the reaction product of an aromatic organic compound having analiphatic carbon-carbon double bond and tetranitromethane are mixed. Silanol containing organosilicon compounds are polymerized by mixing them with the defined catalyst.

---

This invention relates to a method of polymerizing cyclic organosilicon compounds and silanol containing organosilicon compounds.

Cyclic organosilicon compounds have been polymerized by a variety of methods which can be found in the prior art. However, new methods are continually being sought for efficiency and for improved commercial methods for specific compounds, among other reasons. The condensation polymerization of silanol containing organosilicon compounds has been described in the prior art and numerous methods are discussed. As in the case of the polymerization of cyclic organosilicon compounds, improved methods of condensing silanols are still being sought.

It is therefore an object of the present invention to provide a method for polymerizing cyclic organosilicon compounds. It is also an object to provide a method for polymerizing silanol containing organosilicon compounds. These and other objects will become apparent from the following detailed description of the present invention.

This invention relates to a method for polymerizing organosilicon compounds comprising mixing (A) at least one organosilicon compound selected from the group consisting of

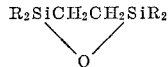

where each R is a monovalent hydrocarbon radical selected from the group consisting of a methyl radical and an ethyl radical, $(RR'SiO)_3$ where R is defined above, each R' is a radical selected from the group consisting of a methyl radical, an ethyl radical and a hydrogen atom, $(RHSiO)_4$ where R is defined above, and an organosilicon compound having an average formula $R''_aSi(X_{0.5})_{4-a}$ where each R'' is a monovalent radical selected from the group consisting of hydrocarbon radicals and halogenated hydrocarbon radicals, X is a divalent radical selected from the group consisting of oxygen atoms, hydrocarbon radicals and halogenated hydrocarbon radicals, $a$ has an average value of from 0.7 to 2.5 inclusive, each $X_{0.5}$ being bonded only to other $X_{0.5}$ of the same kind by which units of $R''_aSi(XX_{0.5})_{4-a}$ are bonded together, and at least one $X_{0.5}$ per molecule of the organosilicon compound where X is a divalent oxygen atom being bonded to a $O_{0.6}H$, (B) a catalyst which is a reaction product of an organic compound having an aliphatic carbon-carbon double bond wherein at least one of the carbon atoms forming the double bond is bonded to an aromatic structure and said organic compound being composed of carbon and hydrogen and any other atoms being selected from the group consisting of oxygen, bromine, chlorine, fluorine and nitrogen and tetranitromethane.

The silethylenesiloxane cyclic of the formula

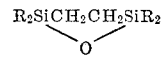

can be any silethylenesiloxane cyclic where R is methyl or ethyl. Examples of these silethylenesiloxane cyclics include

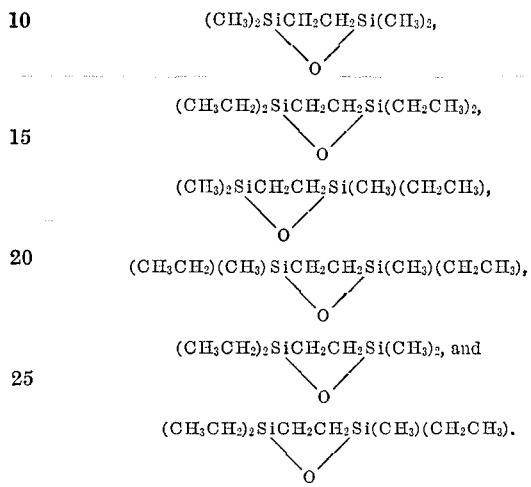

The silethylenesiloxane cyclics can be prepared by the method described in U.S. Pat. No. 3,041,362 (Merker) and in British patent specification No. 1,014,156 published Apr. 13, 1966, both references of which are hereby incorporated by reference. The silethylenesiloxane cyclics prepared by the method described in the British patent are the most easily prepared since all the radicals are the same, while in the Merker method each organic radical can be the same or different. Mixtures of two or more silethylenesiloxane cyclics can be used in the present method.

The cyclic organosilicon compounds of the formula $(RR'SiO)_3$ can be any cyclic organosilicon compound where R is methyl or ethyl, R' is methyl, ethyl or hydrogen. The cyclic organosilicon compounds also include compounds of the formula $(RHSiO)_4$ where R is defined above. Examples of these cyclic organosilicon compounds include, $[(CH_3)_2SiO]_3$, $[(CH_3CH_2)_2SiO]_3$,
$[(CH_3)HSiO]_3$, $[(CH_3)HSiO]_4$, $[(CH_3)(CH_3CH_2)SiO]_3$,
$[(CH_3CH_2)HSiO]_3$, $[(CH_3CH_2)HSiO]_4$,

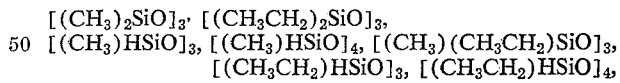

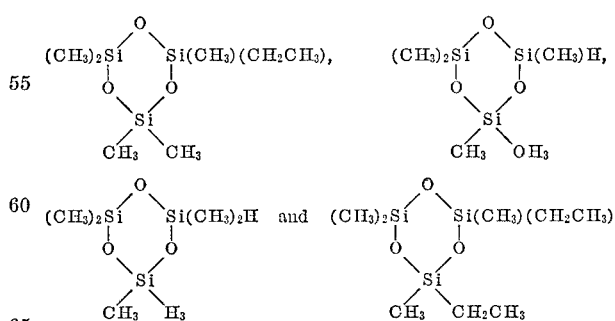

The cyclic organosilicon compounds of the formula

and $(RHSIO)_4$ are well known and can be prepared by well-known methods, such as described in "Organosilicon Compounds" by C. Eaborn, Butterworths Scientific Publications, London, 1960, pages 230 to 231. The cyclic organosilicon compounds can be readily prepared by hydrolyzing RR'SiCl$_2$ without taking any particular precautions. The product mixture formed is distilled to obtain the desired products. When two or more different RR'SiO units are desired in a cyclic organosilicon compound, cohydrolysis of the various corresponding chlorosilanes can be carried out by any of the well-known procedures. The present method can use copolymeric cyclic organosilicon compounds, mixtures of homopolymeric cyclic organosilicon compounds, homopolymeric cyclic organosilicon compounds, mixtures of copolymeric cyclic organosilicon compounds or mixtures of copolymeric and homopolymeric cyclic organosilicon compounds.

The organosilicon compounds of the average unit formula R''$_a$Si(X$_{0.5}$)$_{4-a}$ where R'' is a monovalent hydrocarbon radical or a monovalent halogenated hydrocarbon radical, X is divalent oxygen, a divalent hydrocarbon radical, or a divalent halogenated hydrocarbon radical, $a$ has an average value from 0.7 to 2.5 inclusive, each X$_{0.5}$ is bonded only to other X$_{0.5}$ of the same kind by which units of R''$_a$Si(X$_{0.5}$)$_{4-a}$ are bonded together and at least one X$_{0.5}$ per molecule of the organosilicon compound where X is a divalent oxygen atom is bonded to a O$_{0.5}$H, are well known in the art. For the purpose of this invention R'' can be any monovalent hydrocarbon radical such as methyl, ethyl, isopropyl, tertiary butyl, octadecyl, myricyl, vinyl, allyl, methallyl, hexenyl, butadienyl, cyclopentyl, cyclobutyl, cyclohexyl, benzyl, beta-phenylethyl, phenyl, xenyl, tolyl, naphthyl, and anthracyl, or any monovalent halogenated hydrocarbon radical such as 3,3,3 - trifluoropropyl, C$_9$F$_{19}$CH$_2$CH$_2$—, tetrachlorophenyl, pentabromoxenyl, iodonaphthyl, chlorocyclopentyl, α,α,α-trifluorotolyl and chloromethyl.

The divalent radicals, X, can be divalent oxygen atoms, any divalent hydrocarbon radical, or any divalent halogenated hydrocarbon radical. The divalenthydrocarbon radicals can be, for example, methylene, ethylene, hexylene, octadecylene, propenylene, butenylene, hexenylene, phenylene, xenylene, tolylene, naphthylene and cyclohexylene. The divalent halogenated hydrocarbon radicals can be tetrachlorophenylene, dibromonaphthylene, iodotolylene, bis-(trifluoromethyl)xenylene, and

—CH$_2$CH$_2$CH$_2$CF$_2$CH$_2$CH$_2$CH$_2$—

The organosilicon compounds of the average unit formula R''$_a$Si(X$_{0.5}$)$_{4-a}$ can be a compound of any one or more of the following units so long as at least one X$_{0.5}$ is an oxygen bonded to O$_{0.5}$H: Si(X$_{0.5}$)$_4$, R''Si(X$_{0.5}$)$_3$, R''$_2$Si(X$_{0.5}$)$_2$, and R''$_3$Si(X$_{0.5}$). Since an average of at least one X$_{0.5}$ per molecule must be an oxygen atom bonded to O$_{0.5}$H, the organosilicon compounds of the present invention of the average unit formula R''$_a$Si(X$_{0.5}$)$_{4-a}$ are SiOH containing. Some representative examples to show the various units can be illustrated by having R'' be a methyl radical and X be either an oxygen atom or a phenylene radical: (Si(O$_{0.5}$)$_4$,

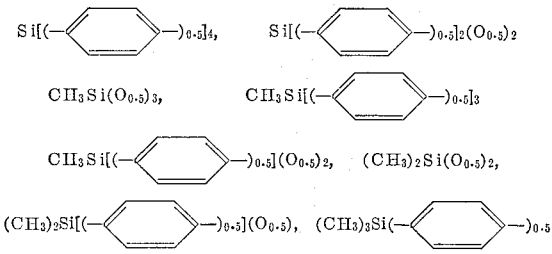

and (CH$_3$)$_3$SiO$_{0.5}$.

This invention requires that X$_{0.5}$ be bonded only to other X$_{0.5}$ of the same kind. For example, if X is oxygen then X$_{0.5}$ is O$_{0.5}$ and this is bonded to O$_{0.5}$ of another unit or to O$_{0.5}$H, and if X is phenylene then X$_{0.5}$ is

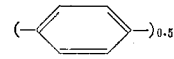

and this is bonded to

of another unit, never to O$_{0.5}$ or a (—CH$_2$—)$_{0.5}$. When a O$_{0.5}$ of a R''$_a$Si(X$_{0.5}$)$_{4-a}$ unit is bonded to a O$_{0.5}$ of another R''$_a$Si(X$_{0.5}$)$_{4-a}$ unit, an SiOSi bond is formed, likewise when X is phenylene, an

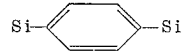

bond is formed. When a O$_{0.5}$ of an R''$_a$Si(X$_{0.5}$)$_{4-a}$ is bonded to a O$_{0.5}$H, an

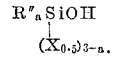

is formed.

The organosilicon compounds of the average unit formula R''$_a$Si(X$_{0.5}$)$_{4-a}$ can be monomers, polymers, mixtures and the like, as long as the above conditions have been met. There can be from one to any number of SiOH groups per molecule, provided the composition falls within the definition given above. Thus, for the purpose of this invention, the organosilicon compounds of the average unit formula R''$_a$Si(X$_{0.5}$)$_{4-a}$ include compounds illustrated by 1,1,3,3-tetramethyl-1,3-disilapropane-1,3-diol, 1,3-dimethyl-1,3-diphenyl-1,3-disiloxane-1,3 - diol, hydroxylated diethylsiloxane polymers, hydroxylated dimethylsiloxane polymers, hydroxylated methylethylsiloxane polymers, hydroxylated phenylmethylsiloxane polymers, hydroxylated 3,3,3-trifluoropropylmethylsiloxane polymers, hydroxylated copolymers of dimethylsiloxane units and phenylmethylsiloxane units, hydroxylated copolymers of dimethylsiloxane units, methylvinylsiloxane units and ethylmethylsiloxane units, hydroxylated copolymers of dimethylsiloxane units and

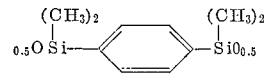

trimethylsilanol, phenylmethylvinylsilanol, diphenylsilanediol, hydroxylated copolymers of chlorophenylmethylsiloxane units and dimethylsiloxane units, hydroxylated copolymers of monophenylsiloxane units, phenylmethylsiloxane units, trimethylsiloxane units, hydroxylated copolymers of dimethylsilphenylene units, phenylmethylsiloxane units and SiO$_2$ units and hydroxylated copolymers of trimethylsiloxane units and SiO$_2$ units. These hydroxylated organosilicon compounds are well known in the art and many can be purchased commercially or prepared by methods well known in the art.

Component (A) can be any one of the organosilicon compounds described above or any mixture of two or more of the organosilicon compounds. For example, (A) can be a cyclic silethylenesiloxane, a mixture of cyclic silethylenesiloxane and a hydroxylated organosilicon compound or a mixture of two different cyclic silethylenesiloxanes.

Component (B) in the present invention is a catalyst which causes certain cyclic organosilicon compounds to polymerize and silanol containing organosilicon compounds to polymerize by condensation of the silanols. Catalyst (B) is the reaction product of tetranitromethane and an organic compound having an aliphatic carbon-carbon double bond wherein at least one of the carbon atoms forming the double bond is bonded to an aromatic structure and the organic compound is composed of carbon, hydrogen and oxygen.

Tetranitromethane is a known compound and can be purchased commercially.

Organic compounds having aliphatic double bonds and an aromatic structure attached to at least one of the carbon atoms of the double bond include compounds, such as,

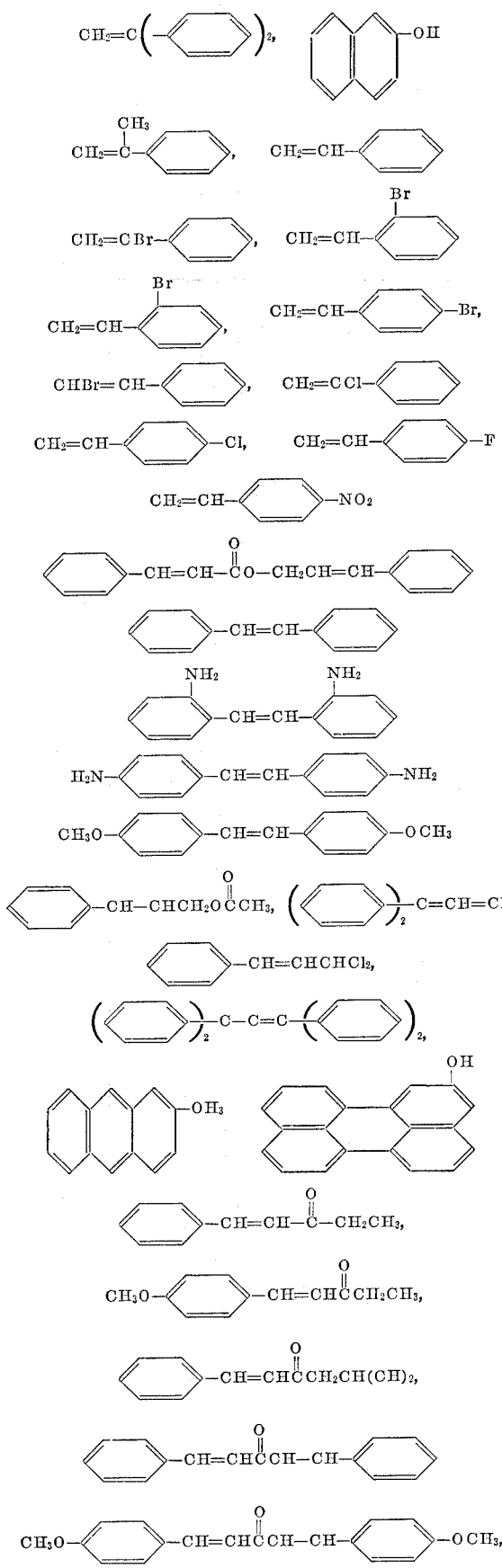

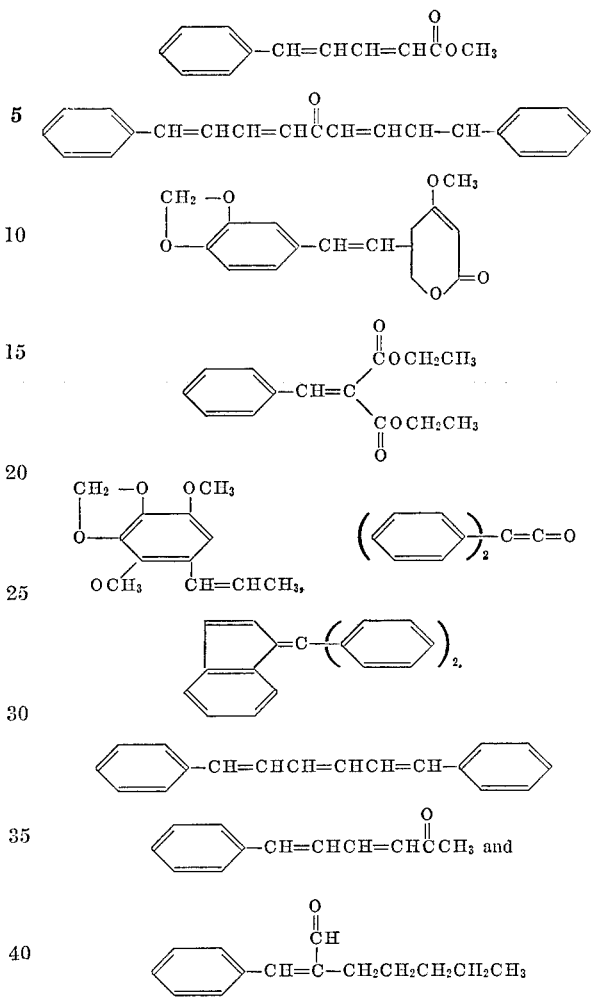

The reaction product of the aromatic organic compound containing an aliphatic carbon-carbon double bond and the tetranitromethane can be obtained by merely mixing the two reactants. When the two reactants are mixed a red color develops, indicating the formation of a complex. The ingredients can be mixed in organic solvents for reaction, such solvents, include benzene, diethyl ether, toluene, xylene, hexane, butylacetate, tetrahydrofuran, polyethers, acetonitrile, 2-pentanone, nitrobenzene, cyclohexane and the like.

Caution must be taken in preparing the catalyst and in storing the catalyst. One should use extreme care in handling tetranitromethane, the reaction mixture, the reaction product (catalyst), and in storing same. Inasmuch as a high ratio of nitro groups to carbon exists, these compounds and products can readily be detonated. It is therefore advised that these compounds and products be handled and prepared with the proper safety equipment and precautions as are used in handling trinitroglycerine or trinitrotoluene. The reaction products are particularly sensitive and can explode in concentrated form. It is therefore advisable to store the reaction products in dilute solutions. The reaction products used as catalyst in the present invention are not dangerous in dilute solutions and in the catalyzed mixture. If a dilute solution of the reaction product is used to catalyze the present process, it can be used and processed in a normal manner and no particular precautions are required other than those normally associated with conventional manufacturing.

The reaction product of the aromatic organic compound containing an aliphatic carbon-carbon double bond and tetranitromethane is a unique catalyst for siloxane polymerization. The reaction product will polymerize

at room temperature when the two are mixed. This is only true as long as R is either methyl or ethyl. Any of the well-known organic solvents for organosiloxanes can be used as a solvent for the reaction process. The reaction rate, if slow at room temperature, can be increased by heating the solution. A polymerization promoter can also be used to increase the reaction rate, such as dimethylsulfoxide. The

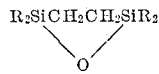

will polymerize to provide a polymer having repeating units of

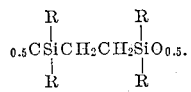

The reaction product can also be used to polymerize cyclic siloxanes of the formula $(RR'SiO)_3$ where R is methyl or ethyl, R' is methyl, ethyl or hydrogen and cyclics of the formula $(RHSiO)_4$. The cyclic siloxanes polymerize by mixing them with the reaction product as described above to produce a polymer of the repeating units RR'SiO and RHSiO respectively. Inasmuch as the cyclic siloxanes of the formula $(RR'SiO)_3$, $(RHSiO)_4$ and

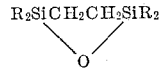

polymerize readily with the reaction product as catalyst only when specific R and R' represent certain radicals, the present process not only is useful for producing fluids and gums which are useful products, but the present process can be used to separate mixtures of various cyclic siloxanes. For example, if a mixture of $[(CH_3)_2SiO]_3$ and $[(CF_3CH_2CH_2)(CH_3)SiO]_3$ exists and it is desirable to separate these, one can add a reaction product according to the present invention and the $[(CH_3)_2SiO]_3$ will polymerize but the $[(CF_3CH_2CH_2)(CH_3)SiO]_3$ will not. Thus, the $[(CH_3)_2SiO]_3$ can readily be separated from the $[(CF_3CH_2CH_2)(CH_3)SiO]_3$ and at the same time the $[(CH_3)_2SiO]_3$ will be polymerized to produce a useful polymer. Although there are many methods of separating such mixtures, the present invention offers a process for preferentially polymerizing only certain species.

The present process can also be used to polymerize silanol containing silicon compounds. As long as a silicon compound contains one SiOH group, the reaction product will condense these SiOH groups to form SiOSi linkages, thus increasing the molecular weight to provide higher molecular weight polymers.

The fluids, gums and resins produced by the present method are useful as, and in making, lubricants, water repellents, elastomers, resins, electrical insulation, laminates, molding compounds and the like.

The following examples are illustrative only and should not be construed as limiting the present invention which is properly delineated in the appended claims.

EXAMPLE 1

In a test tube, 0.9 g. of

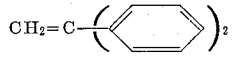

and 1.0 g. of tetranitromethane were mixed. A red color developed indicating a complex formation. The mixture was diluted with nitrobenzene before using it.

EXAMPLE 2

To a mixture of 1.0 g. of

and 0.4 g. of tetrahydrofuran, one drop of the resulting mixture of Example 1 was added. A viscous solution was obtained in 3 days. The solvent was removed by reduced pressure and a fluid of 120,000 cs. at 25° C. was obtained. The fluid was a polymer having repeating units of $$_{0.5}O\underset{\underset{CH_3}{|}}{\overset{\overset{CH_3}{|}}{Si}}CH_2CH_2\underset{\underset{CH_3}{|}}{\overset{\overset{CH_3}{|}}{Si}}O_{0.5}$$

EXAMPLE 3

To a mixture of 1.0 g. of

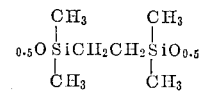

0.4 of tetrahydrofuran and 1 drop of dimethylsulfoxide, one drop of the resulting mixture of Example 1 was added. The polymerization proceeded much faster than in Example 2 and a viscous solution was obtained after 10 minutes. The solvent was removed as in Example 2 and the remaining polymer had a viscosity of 130,000 cs. at 25° C. and was a polymer of the repeating units $$_{0.5}O\underset{\underset{CH_3}{|}}{\overset{\overset{CH_3}{|}}{Si}}CH_2CH_2\underset{\underset{CH_3}{|}}{\overset{\overset{CH_3}{|}}{Si}}O_{0.5}$$

EXAMPLE 4

Examples 2 and 3 were repeated several times except in place of tetrahydrofuran, another solvent was substituted in each experiment. Examples 2 and 3 were repeated using acetonitrile, $CH_3O(CH_2CH_2O)_4CH_3$, hexane, 2-pentanone, benzene and nitrobenzene. In each situation equivalent results were obtained.

EXAMPLE 5

To a mixture of 1.0 g. of $[(CH_3)_2SiO]_3$ and 0.4 g. of benzene, one drop of the resulting mixture of Example 1 and 2 drops of dimethylsulfoxide was added. The polymerization was carried out at 60° C. for 4 days. After removal of the solvent as in Example 2, a polymer of repeating units $(CH_3)_2SiO$ and having a viscosity of 6,000 cs. at 25° C. was obtained.

EXAMPLE 6

Example 5 was repeated three times, each time using a different solvent. The solvents used were toluene, tetrahydrofuran and cyclohexane. The results were equivalent to Example 5.

EXAMPLE 7

To 1.0 g. of $[(CH_3)HSiO]_4$, one drop of the resulting mixture of Example 1 and 3 drops of dimethylsulfoxide was added. The solution was allowed to stand at room temperature for 10 days. The resulting polymer was extremely viscour and retained all the silicon-bonded hydrogen atoms as determined by nuclear magnetic resonance analysis. The process was repeated except acetonitrile was substituted for dimethylsulfoxide with equivalent results.

EXAMPLE 8

This experiment illustrates the condensation process of polymerization. A mixture of 50 g. of a hydroxyl endblocked polydimethylsiloxane having a $\bar{M}_w$ (molecular weight-weight average) of 8,00 and a $\bar{M}_n$ (molecular weight-number average) of 7,500, 50 g. of cyclohexane and 2 g of dimethylsulfoxide was added to a 250 ml. three-neck flask equipped with a mechanical stirrer, condenser and a water trap. The solution was azeotroped for 30 minutes during which time no water was collected in the trap indicating no SiOH—SiOH condensation. On the addition of 2 drops of the resulting mixture of Example 1, vigorous condensation immediately took place and water began collecting in the trap. After 18.5 hours the solution became extremely viscour and gel permeation analysis showed that $\overline{M}_w$ was 125,000 and $\overline{M}_n$ was 45,000.

EXAMPLE 9

One gram of tetranitromethane was mixed with 0.7 g. of

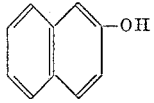

The mixture immediately turned red indicating a complex formation. The mixture was diluted with nitrobenzene.

EXAMPLE 10

To a mixture of 1.0 g. of

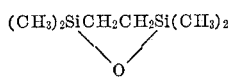

and 2 drops of dimethylsulfoxide, one drop of the resulting mixture of Example 9 was added. The solution became very viscous after one hour and after removal of the solvent, a polymer of repeating units

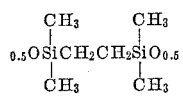

and a viscosity of 120,000 cs. at 25° C. was obtained.

This experiment was repeated using acetonitrile in place of dimethylsulfoxide, equivalent results were obtained.

EXAMPLE 11

Example 10 was repeated with equivalent results using a reaction product of

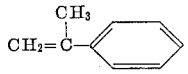

and tetranitromethane in place of the resulting mixture of Example 9.

EXAMPLE 12

When the following compounds are mixed with tetranitromethane as described in Example 1 and the resulting mixtures are used in Example 10 to replace the resulting mixture of Example 9, equivalent results are obtained.

(1) 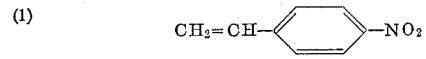

(2) 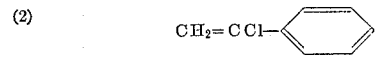

(3) 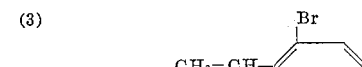

(4) 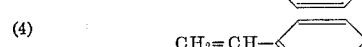

(5) 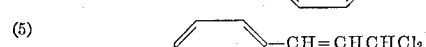

(6) 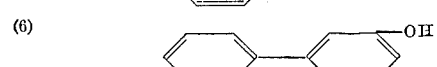

(7) 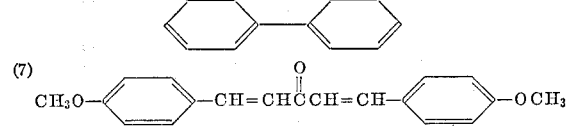

(8) 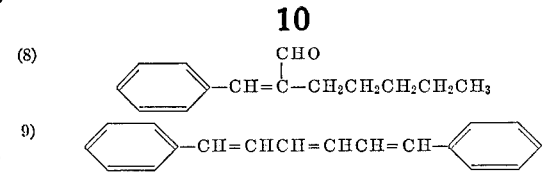

(9) $\langle\bigcirc\rangle$—CH=CHCH=CHCH=CH—$\langle\bigcirc\rangle$

EXAMPLE 13

When the following compositions are mixed with the resulting product of Example 1, a higher molecular weight product is obtained.

(1) $(CH_3CH_2)_2SiCH_2CH_2Si(CH_3)_2$
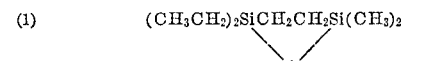

(2) a mixture of 50 weight percent
$(CH_3)_2SiCH_2CH_2Si(CH_3)(CH_2CH_3)$
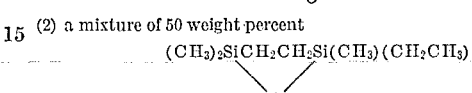

and 50 weight percent
$(CH_3CH_2)_2SiCH_2CH_2Si(CH_2CH_3)_2$.

(3) 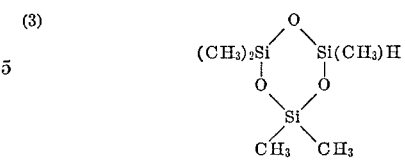

(4) a mixture of 20 weight percent $[(CH_3)HSiO]_4$ and 80 weight percent $[(CH_3)(CH_3CH_2)SiO]_3$.

(5) a hydroxylated polymer composed of 20 mol percent $(CH_3)_2SiO$ units, 20 mol percent $(CH_3)SiO_{1.5}$ units, 16 mol percent

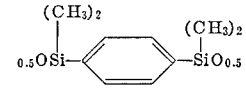

units, 13 mol percent $C_6H_5SiO_{1.5}$ units, 5 mol percent $SiO_2$ units, 4 mol percent

units and 2 mol percent of $(C_6H_5)(CH_3)(CH_2=CH)SiO_{0.5}$ units.

(6) a mixture of 10 weight percent

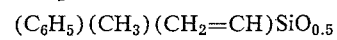

10 weight percent of a hydroxyl end blocked 3,3,3-trifluoropropylmethylsiloxane polymer having a viscosity of 450 cs. at 25° C. and 80 weight percent of a hydroxyl endblocked dimethylsiloxane polymer having a viscosity of 850 cs. at 25° C.

(7) $(CH)_{33}SiOH$ and $(CH_3)_2Si(OH)_2$ in a mole ratio of 2:1

That which is claimed is:

1. A method for polymerizing organosilicon compounds comprising mixing (A) at least one organosilicon compound selected from the group consisting of

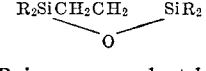

where each R is a monovalent hydrocarbon radical selected from the group consisting of a methyl radical and an ethyl radical, $(RR'SiO)_3$ where R is defined above, each R' is a radical selected from the group consisting of a methyl radical, an ethyl radical and a hydrogen atom, $(RHSiO)_4$ where R is defined above, and an organosilicon compound having an average formula $R''_aSi(X_{0.5})_{4-a}$ where each R'' is a monovalent radical selected from the group consisting of hydrocarbon radicals and halogenated hydrocarbon radicals, X is a divalent radical selected from the group consisting of oxygen atoms, hydrocarbon radicals and halogenated hydrocarbon radicals, $a$ has an average value of from 0.7 to 2.5 inclusive, each $X_{0.5}$ being bonded only to other $X_{0.5}$ of the same kind by which units of $R''_aSi(X_{0.5})_{4-a}$ are bonded together and at least one $X_{0.5}$ per molecule of the organosilicon compound where X is a divalent oxygen atom being bonded to a $O_{0.5}H$, (B) a catalyst which is selected from the group consisting of a reaction product of an organic compound having an aliphatic carbon-carbon double bond wherein at least one of the carbon atoms forming the double bond is bonded to an aromatic structure and said organic compound being composed of carbon and hydrogen and any other atoms being selected from the group consisting of oxygen, bromine, chlorine, fluorine and nitrogen and tetranitromethane and a reaction product of a compound selected from the group consisting of

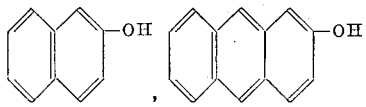

and

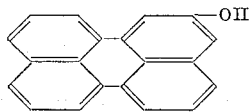

and tetranitromethane.

2. The method in accordance with claim 1 wherein (A) is

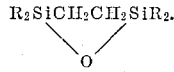

3. The method in accordance with claim 1 wherein (A) is $(RR'SiO)_3$.

4. The method in accordance with claim 1 wherein (A) is $(RHSiO)_4$.

5. The method in accordance with claim 1 wherein (A) is an organosilicon compound having an average formula $R''_aSi(X_{0.5})_{4-a}$.

6. The method in accordance with claim 1 wherein (B) is a reaction product of

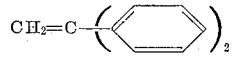

and tetranitromethane.

7. The method in accordance with claim 2 wherein (B) is a reaction product of

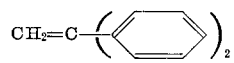

and tetranitromethane.

8. The method in accordance with claim 3 wherein (B) is a reaction product of

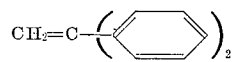

and tetranitromethane.

9. The method in accordance with claim 4 wherein (B) is a reaction product of

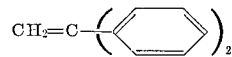

and tetranitromethane.

10. The method in accordance with claim 5 wherein (B) is a reaction product of

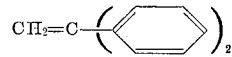

and tetranitromethane.

11. The method in accordance with claim 1 wherein (B) is a reaction product of

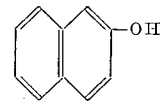

and tetranitromethane.

12. The method in accordance with claim 1 wherein (B) is a reaction product of

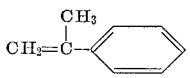

and tetranitromethane.

13. The method in accordance with claim 2 wherein (A) is

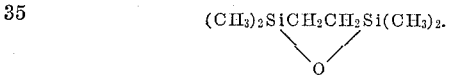

14. The method in accordance with claim 3 wherein (A) is $[(CH_3)_2SiO]_3$.

15. The method in accordance with claim 4 wherein (A) is $[(CH_3)HSiO]_4$.

16. The method in accordance with claim 1 wherein a dimethylsulfoxide is present.

17. The method in accordance with claim 1 wherein an organic solvent is present.

References Cited

UNITED STATES PATENTS 3,445,426   5/1969   Lee  ---------------- 260—46.5
3,481,989   12/1969   Davies et al.  -------- 260—46.5

M. J. WELSH, Primary Examiner

M. I. MARQUIS, Assistant Examiner

U.S. Cl. X.R.

252—49.6, 63.7; 260—448.2, 645, 646